United States Patent
Nguyen

(10) Patent No.: US 6,290,551 B1
(45) Date of Patent: Sep. 18, 2001

(54) ELECTRICAL CONNECTOR HAVING ULTRASONICALLY WELDED HOUSING PIECES

(75) Inventor: Tam M. Nguyen, Lancaster, PA (US)

(73) Assignee: FCI USA, Inc., York, PA (US)

( * ) Notice: Subject to any disclaimer, the term of this patent is extended or adjusted under 35 U.S.C. 154(b) by 0 days.

(21) Appl. No.: 09/516,273

(22) Filed: Feb. 29, 2000

(51) Int. Cl.⁷ ................................................ H01R 11/01
(52) U.S. Cl. ......................................... 439/724; 29/876
(58) Field of Search .................................. 439/724, 278, 439/275, 281, 588, 587, 589, 701; 29/878, 876

(56) References Cited

U.S. PATENT DOCUMENTS

| | | | |
|---|---|---|---|
| 4,301,343 | * 11/1981 | Jonelis | 200/283 |
| 4,828,509 | * 5/1989 | Vogel | 439/278 |
| 5,380,226 | 1/1995 | Anderson | 439/724 |
| 5,569,050 | * 10/1996 | Lloyd | 439/465 |

* cited by examiner

Primary Examiner—Tho D. Ta
(74) Attorney, Agent, or Firm—Perman & Green, LLP

(57) ABSTRACT

An electrical connector comprising at least one electrical contact; and a housing connected to the contact. The housing has at least two housing pieces comprised of ultrasonically weldable material. A first one of the housing pieces has grooves. A second one of the housing pieces has projections located in the grooves. At least one of the projections comprise an energy director leading section which has a general cross-sectional wedge shape before ultrasonic welding of the first and second housing pieces to each other for use in directing energy during ultrasonic welding.

13 Claims, 3 Drawing Sheets

ELECTRICAL CONNECTOR HAVING ULTRASONICALLY WELDED HOUSING PIECES

BACKGROUND OF THE INVENTION

1. Field of the Invention

The present invention relates to electrical connectors and, more particularly, to ultrasonically welded housing pieces.

2. Prior Art

U.S. Pat. No. 5,380,226 discloses a housing for an electrical connector which comprises two housing pieces that are ultrasonically welded to each other. Ultrasonic welding is not without posing some problems. Efficient welding and sealing at the welds are not easy to obtain without taking some precautions before welding. There is a need for more efficient welding and sealing that has heretofore not been provided.

SUMMARY OF THE INVENTION

In accordance with one embodiment of the present invention, an electrical connector is provided comprising at least one electrical contact; and a housing connected to the contact. The housing has at least two housing pieces comprised of ultrasonically weldable material. A first one of the housing pieces has grooves. A second one of the housing pieces has projections located in the grooves. At least one of the projections comprise an energy director leading section which has a general cross-sectional wedge shape before ultrasonic welding of the first and second housing pieces to each other for use in directing energy during ultrasonic welding.

In accordance with another embodiment of the present invention, an electrical connector is provided comprising at least one electrical contact; and a housing connected to the contact. The housing has at least two housing pieces which are ultrasonically welded to each other. A first one of the housing pieces has grooves which receive projections of a second one of the housing pieces. At least one of the grooves comprise an outer perimeter groove facing an outer lateral side and a bottom side of the first housing piece. The outer perimeter groove comprises a flash director at an outer side of the outer perimeter groove.

In accordance with one method of the present invention, a method for ultrasonically welding two electrical connector housing pieces to each other is provided. The method comprises steps of positioning projections of a first one of the housing pieces into grooves of a second one of the housing pieces, wherein the projections including energy director leading ends which have general cross-sectional wedge shapes, and wherein the grooves include an outer groove facing an outer lateral side and a bottom side of the second housing piece which comprises a flash director at an outer side of the outer groove; ultrasonically welding the two housing pieces to each other; and automatically aligning the first and second housing pieces relative to each other during the step of ultrasonically welding, wherein the wedge shaped leading ends of the projections and the flash director of the outer groove cause self-alignment to a predetermined position of the two pieces with each other.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
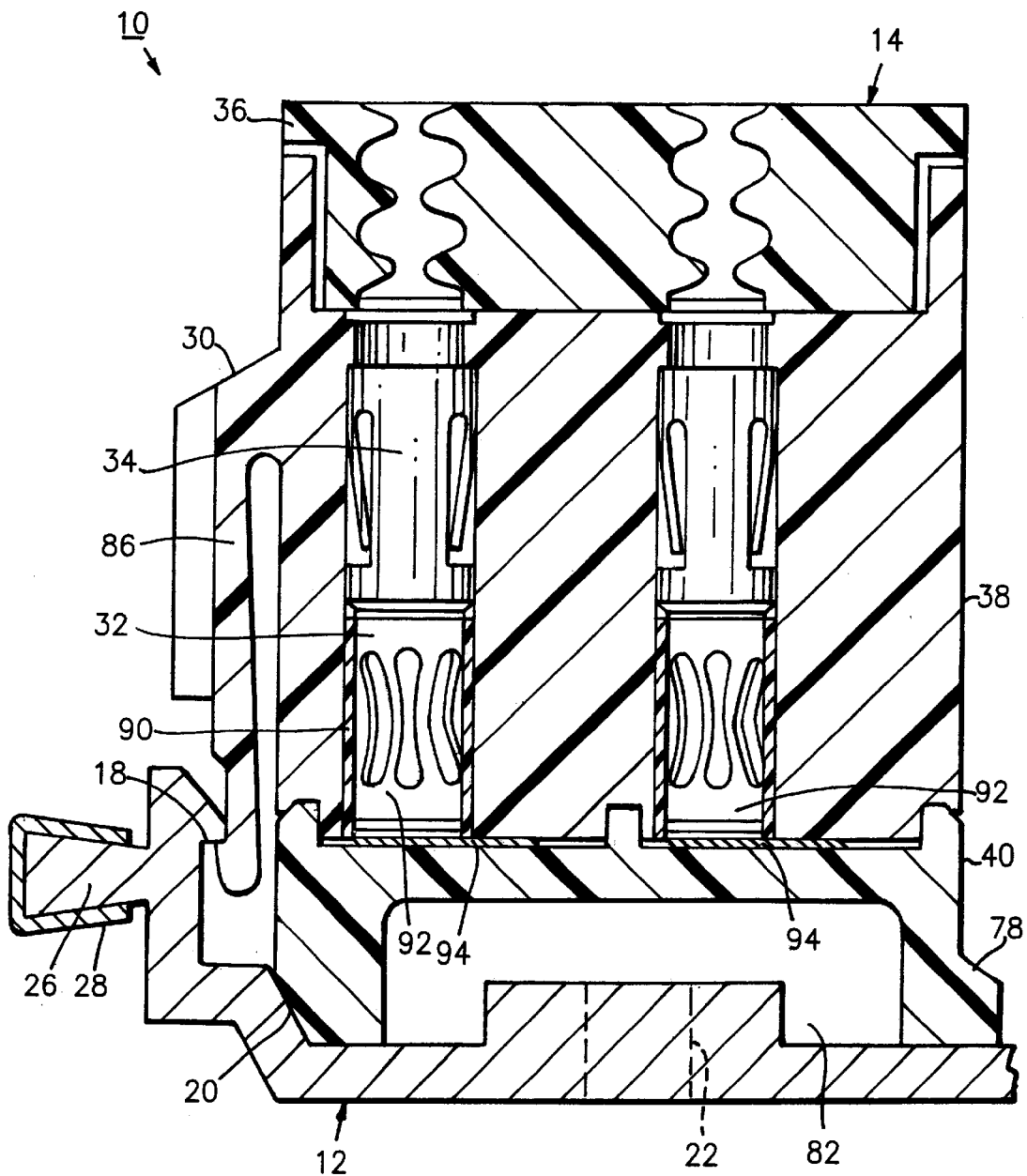
FIG. 1 is a cross-sectional view of an electrical connector incorporating features of the present invention shown attached to a mounting track.

Referring to FIG. 1, there is shown a cross-sectional view of an electrical connector 14 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The connector 14 can be part of an electrical connection system 10 comprising a mounting track 12, a plurality of the connectors 14 mounted to the track 12, and perhaps one or more grounding connectors (not shown) also attached to the track 12. One such similar system is described in U.S. Pat. No. 5,380,226 which is hereby incorporated by reference in its entirety. However, features of the present invention can be incorporated in any suitable type of electrical connector which has two housing pieces ultrasonically welded to each other.

The track 12 is preferably made of electrically conductive metal. The track 12 has a snap-lock ledge 18, a cam surface 20 proximate the ledge 18, a first series of holes 22 for mounting the track 12 to a frame of the aircraft, a second series of holes (not shown) for mounting the grounding blocks to the track 12, and a lateral ridge 26 for mounting a marking strip 28 along the length of the track 12. In a preferred embodiment, the track is adapted to have a plurality of signal connectors removably snap-lock connected to it and, a plurality of grounding blocks fixedly connected to the track.

Figure 2:
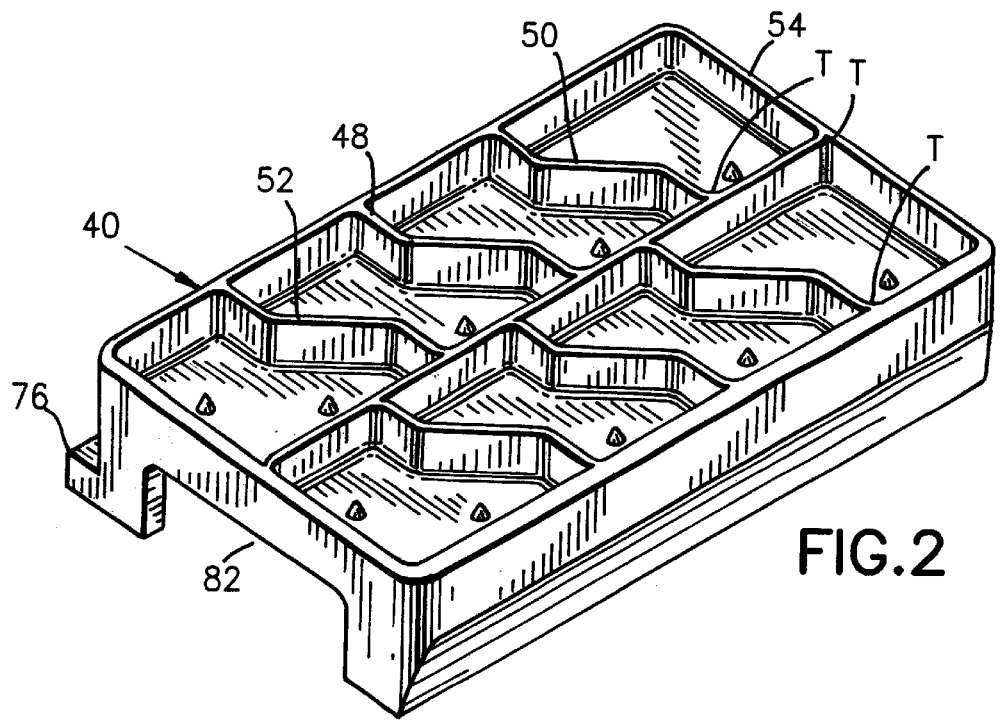
FIG. 2 is a perspective view showing a top side of a bottom piece of the housing of the connector shown in FIG. 1.
Figure 7:
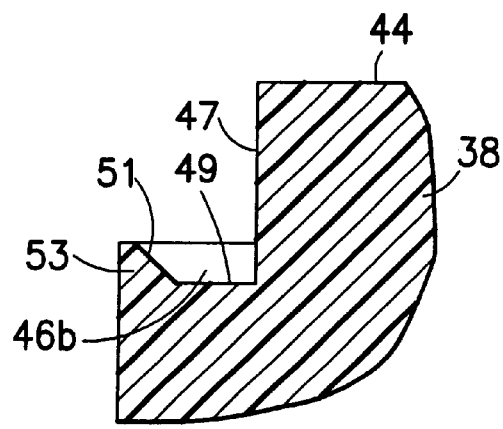
FIG. 7 is a partial cross-sectional view of the bottom edge of the top housing piece shown in FIG. 3.

The signal connectors or terminal blocks 14 each comprise a housing 30, at least one terminal 32, retaining clips 34, and a grommet 36. The housing 30 is comprised of a housing top 38 and a housing bottom 40 made of ultrasonically weldable dielectric material. Referring also to FIG. 2, a perspective view of a top side of the bottom 40 is shown and, referring also to FIG. 3, a perspective view of a bottom side of the top 38 is shown. The top 38 has a plurality of contact receiving areas 42. The bottom surface 44 of the top 38 has a pattern of grooves 46 extending into the bottom surface. The grooves 46 include inner grooves 46a and an outer perimeter groove 46b. Before ultrasonic welding, the inner grooves 46a have a general uniform rectangular cross-sectional shape, and the outer groove 46b has a shape as shown in FIG. 7 which will be described in more detail below. In the embodiment shown, the housing top 38 has sixteen contact receiving areas 42 that are grouped in sets of two and separated by the inner grooves 46a. However, any suitable number of contact receiving areas 42 could be provided, any pattern of grooves 46 could be provided, and any type of sets of receiving areas 42 could be provided. In the embodiment shown, the housing top 38 is adapted to be used with any one of a number of different housing bottoms as explained in U.S. Pat. No. 5,380,226, but only one type of housing bottom 40 will be described for purposes of description of the present invention. Located on one side of the top 38 is a snap-lock latch 86. The latch 86 extends from the top 38 in general cantilever fashion and includes a snap-lock ledge 88. The top 38 is preferably made of a polymer material such that the latch 86 can be deflected towards the top 38. In the embodiment shown, located on opposite sides of the latch 86 are studs 87 adapted to prevent inadvertent or accidental movement of the latch 86.

The bottom housing piece 40 has a top surface 48 with projections or tongues 50. The tongues 50 include inner tongues 52 and an outer perimeter tongue 54. Some of the inner tongues 52 have general zig-zag shapes. However, any suitable tongue pattern could be provided. The bottom 40 also comprises toes 76 and a key 78 on a first side. A space 82 is provided at the underside of the bottom 40 to allow the terminal blocks 14 to be mounted over fasteners (not shown) that fasten the track 12 to the aircraft frame. The bottom 40 is positioned with its tongues 50 located in the grooves 46 of the top 38 and ultrasonically welded to thereby fix the bottom 40 to the top 38 and from a seal at the welded areas of the tongues in the grooves.

Prior to connecting the bottom 40 to the top 38, the terminals 32, retaining clips 34, and contact spacers 90 are inserted into the receiving areas 42. The contact terminals 32 preferably comprise a plurality of socket contacts 92 interconnected by a busing strip 94. Of course, any suitable type of terminals could be provided. In addition, the contact spacers need not be provided and, the retaining clips 34 could be provided as integrally formed with the terminals 32.

The terminals 32 are preferably comprised of sheet metal that has been cut and preformed to provide a one-piece terminal having multiple contacts 92 electrically and mechanically interconnected to each other by the busing strip 94. In the embodiment shown, the contacts 92 are female contacts with eight inwardly bent spring legs that form male contact receiving areas. However, any suitable type of contacts could be provided. The housing 30 is preferably adapted to be useable with terminals having different size receiving areas to be able to receive different size male contacts. Therefore, it should be noted that any suitable type of terminals could be used.

Once the retainer clips 34, spacers 90, and contacts 92 are inserted into the receiving areas 42, the housing bottom 40 is then connected to the housing top 38. For the embodiment shown in FIG. 1 the busing strips 94 of the eight terminals extend along the bottom of the housing top 38 and are sandwiched between the top and bottom housings. The tongues 52 extends into grooves 46a and the tongue 54 extends into groove 46b. When ultrasonically welded, the housing top and bottom form eight sealed areas; thereby sealing off the terminals from each other. The grommet 36 is then connected to the housing top 38 by suitable means, such as epoxy adhesive.

Figure 4:
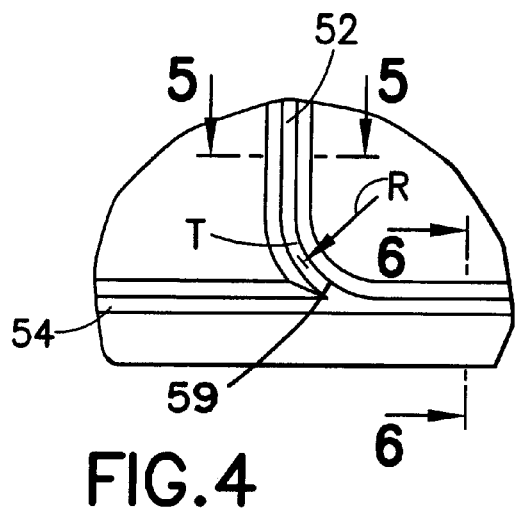
FIG. 4 is a partial top plan view of a portion of the top side of the bottom housing piece shown in FIG. 2.
Figure 5:
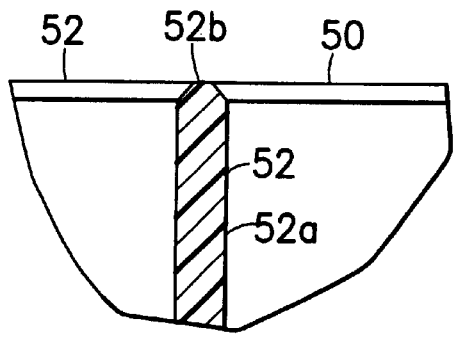
FIG. 5 is a cross-sectional view taken along line 5—5 of FIG. 4.
Figure 6:
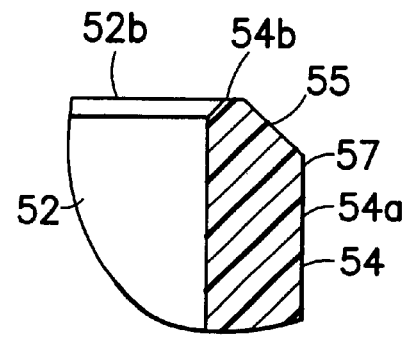
FIG. 6 is a cross-sectional view taken along line 6—6 of FIG. 4.

Referring now to FIGS. 4–6, the tongues 52 and 54 have been provided with an improved shape for better welding of the two housing pieces 38, 40 to each other and, for better sealing off of the areas receiving the busing strips 94 from each other. The inner tongues 52 comprise a main section 52a and a leading end or tip 52b. The main section 52a has a uniform cross-sectional width which is about the same size as the cross-sectional width of the inner grooves 46a. The leading end 52b has a general wedge shaped or pointed shape cross-section which forms an ultrasonic welding energy director leading section for use in directing energy during ultrasonic welding. The outer tongue 54 comprises a main section 54a and a leading end or tip 54b. The main section 54a has an outer side sloped surface 55 between an outer surface 57 and the tip 54b. The tip 54b has a general wedge shaped or pointed shape cross-section which forms an ultrasonic welding energy director leading section for use in directing energy during ultrasonic welding. The tongues also comprise joints 59 connecting the inner tongues 52 to the outer tongue 54 and also connecting the inner tongues 52 to each other. The joints 59 each comprise a curved radius transition T. Any suitable radius distance R for the transition T could be provided such as about 0.05 inch. The radius transition from the internal energy director 52b to the perimeter energy director 54b provides a consistent surface area for uniform melting of the plastic materials of the two housing pieces 38, 40.

Figure 3:
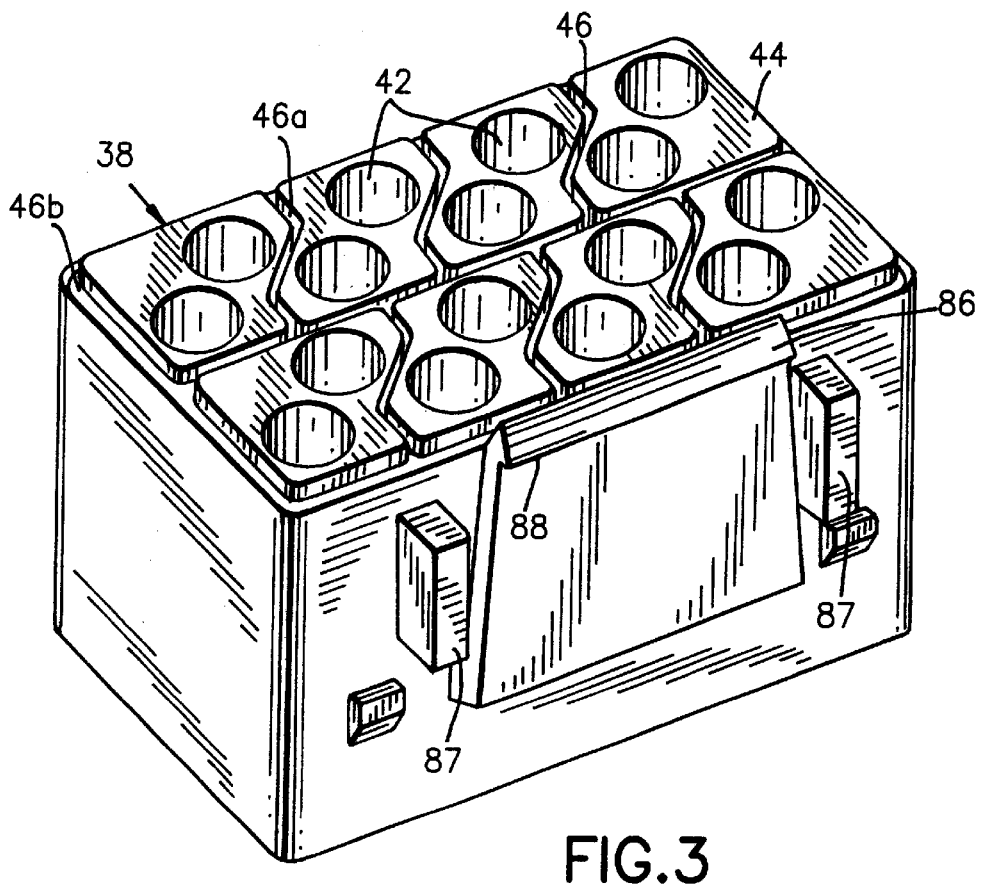
FIG. 3 is a perspective view showing the bottom side of a top piece of the housing of the connector shown in FIG. 1.

Referring to FIGS. 3 and 7, the transitions between grooves 46a, 46b have curved shapes to accommodate the transitions T. As noted above, the inner grooves 46a preferably have a uniform general rectangular cross-section. The outer groove 46b generally faces an outer lateral side and a bottom side of the top housing piece 38. The outer groove 46b generally comprises a straight flat inner wall surface 47, a bottom surface 49, and an outer wall surface 51. The outer wall surface 51 is part of a flash director 53 that defines the outer groove 46b. The width of the outer groove 46b is about the same width as the main section 54a of the tongue 54. The slope of the outer wall surface 51 is about the same as the sloped surface 55 of the outer tongue 54. The flash director 53 is incorporated into the perimeter weld groove to control the flash flow of material during ultrasonic welding. The flash director 53 also functions as a second energy director (besides energy director 54b) to re-melt with the flash to provide additional welding and sealing.

The objective of the present invention is to utilize ultrasonic welding technology in the manufacturing process to achieve optimal welding and sealing of the connector components (foot and body). This design is applicable to any two piece connector system. This design incorporates the use of one or more energy directors/concentrators to ultrasonically weld and seal the foot to the upper body. There are two areas of the connector system that utilize the weld joint. The primary area is the perimeter seal, and the secondary areas are the internal seals. Both areas serve to weld the components together. In addition, the perimeter seal provides external sealing of the contact systems to the environment, while the internal seals provide sealing/separation of the contacts from bus to bus. The embodiment described above also allows for a self-alignment feature due to the shaped surfaces 51, 55 to aid in the fixturing of the components.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical connector comprising:
   at least one electrical contact; and a housing connected to the contact and having at least two housing pieces comprised of ultrasonically weldable material, a first one of the housing pieces having grooves and a second one of the housing pieces having projections located in the grooves, wherein at least one of the projections comprise an energy director leading section which has a general cross-sectional wedge shape before ultrasonic welding of the first and second housing pieces to each other for use in directing energy during ultrasonic welding, wherein the grooves comprise an outer perimeter groove facing an outer lateral side and a bottom side of the first housing piece, and wherein the outer perimeter groove comprises a flash director at an outer side of the outer perimeter groove.

2. An electrical connector as in claim 1 wherein the grooves comprise inner grooves on the bottom side of the first housing piece connected to the outer perimeter groove.

3. An electrical connector as in claim 1 wherein the projections comprise a perimeter projection and at least one inner projection connected to the perimeter projection.

4. An electrical connector as in claim 3 wherein both the perimeter projection and the inner projection comprise the energy director leading section.

5. An electrical connector comprising:

at least one electrical contact; and a housing connected to the contact and having at least two housing pieces comprised of ultrasonically weldable material, a first one of the housing pieces having grooves and a second one of the housing pieces having projections located in the grooves, wherein at least one of the projections comprise an energy director leading section which has a general cross-sectional wedge shape before ultrasonic welding of the first and second housing pieces to each other for use in directing energy during ultrasonic welding, wherein the projections comprise a perimeter projection and at least one inner projection connected to the perimeter projection, and wherein the projections comprise a connection joint between the perimeter projection and the inner projection, the connection joint comprising a curved radius transition from the inner projection into the perimeter projection.

6. An electrical connector comprising:

at least one electrical contact; and a housing connected to the contact and having at least two housing pieces comprised of ultrasonically weldable material, a first one of the housing pieces having grooves and a second one of the housing pieces having projections located in the grooves, wherein at least one of the projections comprise an energy director leading section which has a general cross-sectional wedge shape before ultrasonic welding of the first and second housing pieces to each other for use in directing energy during ultrasonic welding, wherein the grooves and projections comprise means for automatically aligning the first and second housing pieces relative to each other at a predetermined position during ultrasonic welding of the two housing pieces to each other.

7. An electrical connector comprising:

at least one electrical contact; and a housing connected to the contact and having at least two housing pieces which are ultrasonically welded to each other, a first one of the housing pieces having grooves which receive projections of a second one of the housing pieces, wherein at least one of the grooves comprise an outer perimeter groove facing an outer lateral side and a bottom side of the first housing piece, and wherein the outer perimeter groove comprises a flash director at an outer side of the outer perimeter groove.

8. An electrical connector as in claim 7 wherein the flash director extends only partially up a depth of the outer perimeter groove.

9. An electrical connector as in claim 7 wherein the outer perimeter groove comprises a substantially straight inner wall and the flash director comprises an angled surface facing the inner wall.

10. An electrical connector as in claim 7 wherein the grooves comprise inner grooves connected to the outer perimeter groove, the inner grooves comprising a uniform cross-section.

11. An electrical connector as in claim 7 wherein the projections comprise an outer perimeter projection with an energy director general wedge shaped leading end.

12. An electrical connector as in claim 11 wherein the projections comprise at least one inner projection connected to the outer perimeter projection with a curved radius transition joint between the inner projection and the outer perimeter projection.

13. A method for ultrasonically welding two electrical connector housing pieces to each other, the method comprising steps of:

positioning projections of a first one of the housing pieces into grooves of a second one of the housing pieces, wherein the projections including energy director leading ends which have general cross-sectional wedge shapes, and wherein the grooves include an outer groove facing an outer lateral side and a bottom side of the second housing piece which comprises a flash director at an outer side of the outer groove;

ultrasonically welding the two housing pieces to each other; and automatically aligning the first and second housing pieces relative to each other during the step of ultrasonically welding, wherein the wedge shaped leading ends of the projections and the flash director of the outer groove cause self-alignment to a predetermined position of the two pieces with each other.

\* \* \* \* \*